US006484255B1

(12) United States Patent
Dulong (10) Patent No.: US 6,484,255 B1
(45) Date of Patent: Nov. 19, 2002

(54) SELECTIVE WRITING OF DATA ELEMENTS FROM PACKED DATA BASED UPON A MASK USING PREDICATION

(75) Inventor: Carole Dulong, Saratoga, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/399,612

(22) Filed: Sep. 20, 1999

(51) Int. Cl.[7] .......................... G06F 9/315; G06F 13/38
(52) U.S. Cl. .................. 712/224; 712/225; 712/22; 710/49; 710/30
(58) Field of Search ............................... 712/635, 201, 712/624, 245, 217, 229, 218, 228, 219, 215, 227, 224, 223, 221, 225, 13, 2, 5, 9, 30, 22; 708/652; 707/101; 382/253, 236, 239; 703/13; 711/109, 110, 111, 125, 156, 113, 145, 104, 152, 146, 163, 169, 168, 173, 172, 204, 216, 212, 108; 365/189.01, 189.02; 710/127, 20, 130, 61, 7, 49, 12, 50, 19, 51, 30, 52, 29, 37

(56) References Cited

U.S. PATENT DOCUMENTS

| 4,747,066 | A | | 5/1988 | Sumi | |
| 5,383,154 | A | * | 1/1995 | Shibuya | ...................... 711/104 |
| 5,467,413 | A | * | 11/1995 | Barrett | ........................ 382/236 |
| 5,680,332 | A | | 10/1997 | Raimi et al. | .................. 703/13 |
| 6,067,617 | A | | 5/2000 | Webb et al. | ................. 712/245 |

FOREIGN PATENT DOCUMENTS

| EP | 0 967 544 A3 | 6/1999 |
| EP | 0967544 A2 | 6/1999 |
| EP | 0 967 544 A2 | 6/1999 |
| WO | PCT/US00/23721 | 12/2000 |

OTHER PUBLICATIONS

Fernandes E S T et al: "Conditional Execution: an Approach for Eliminating the Basic Block Barriers", Microprocessing and Microprogramming, NL, Elsevier Science Publishers, BV., Amsterdam, vol. 40, No. 10, Dec. 1, 1994, pp. 689–692, XP004014234 ISSN: 0165–6074 p. 2, column 1–column 2.
Song, P., *Demystifying EPIC and IA–64, EPIC Is a Natural Evolution of RISC, Making It Easy to Retrofit Onto RISC*, Microprocessor Report, 1998, 7 pgs.
Case, B., *ARM Architecture Offers High Code Density, Non–Traditional RISC Encodes Many Options in Each Instruction*, Microprocessor Report, 1991, pp. 11–14.
Gwennap, L., *Intel, HP Make EPIC Disclosure, IA–64 Instruction Set Goes Beyond Traditional RISC, VLIW*, Microprocessor Report, vol. 11, No. 14, 1997, 5 pgs.

* cited by examiner

*Primary Examiner*—Daniel H. Pan
(74) *Attorney, Agent, or Firm*—Blakely, Sokoloff, Taylor & Zafman LLP (57) ABSTRACT

A method and apparatus for selectively writing data elements from packed data based upon a mask using predication. In one embodiment of the invention, for each data element of a packed data operand, the following is performed in parallel processing units: determining a predicate value for the data element from one or more bits of a corresponding packed data mask element indicating whether the data element is selected for writing to a corresponding storage location, and storing in the corresponding storage location the data element based on the predicate value.

51 Claims, 4 Drawing Sheets

SELECTIVE WRITING OF DATA ELEMENTS FROM PACKED DATA BASED UPON A MASK USING PREDICATION

BACKGROUND OF THE INVENTION

1. Field of the Invention

The invention relates to the field of computer systems. More specifically, the invention relates to the selective writing of data element from packed data based on a Mask using predication.

2. Background Information

Computer technology continues to evolve at an ever-increasing rate. Gone are the days when the computer was merely a business tool primarily used for word-processing and spreadsheet applications. Today, with the evolution of multimedia applications, computer systems have become a common home electronic appliance, much like the television and home stereo system. Indeed, the line between computer system and other consumer electronic appliance has become blurred as multimedia applications executing on an appropriately configured computer system will function as a television set, a radio, a video playback device, and the like. Consequently, the market popularity of computer systems is often decided by the amount of memory they contain and the speed at which they can execute such multimedia applications.

Those skilled in the art will appreciate that multimedia and communications applications require the manipulation of large amounts of data represented in a small number of bits to provide the true-to-life renderings of audio and video we have come to expect. For example, to render a 3D graphic, a relatively large collection of individual data items (e.g., eight-bit data) must be similarly processed.

One common operation required by such applications is the writing of selected data items from a collection of data items to memory. Whether a given data item is to be written to memory is based upon a mask. An approach to moving select bytes of data uses a test, branch, and write series of instructions. In accordance with this approach, one or more of the mask bits for each corresponding data item is tested and a branch is used to either write or bypass writing the byte to memory. However, this approach suffers a performance penalty for branch mispredictions.

Figure 1:
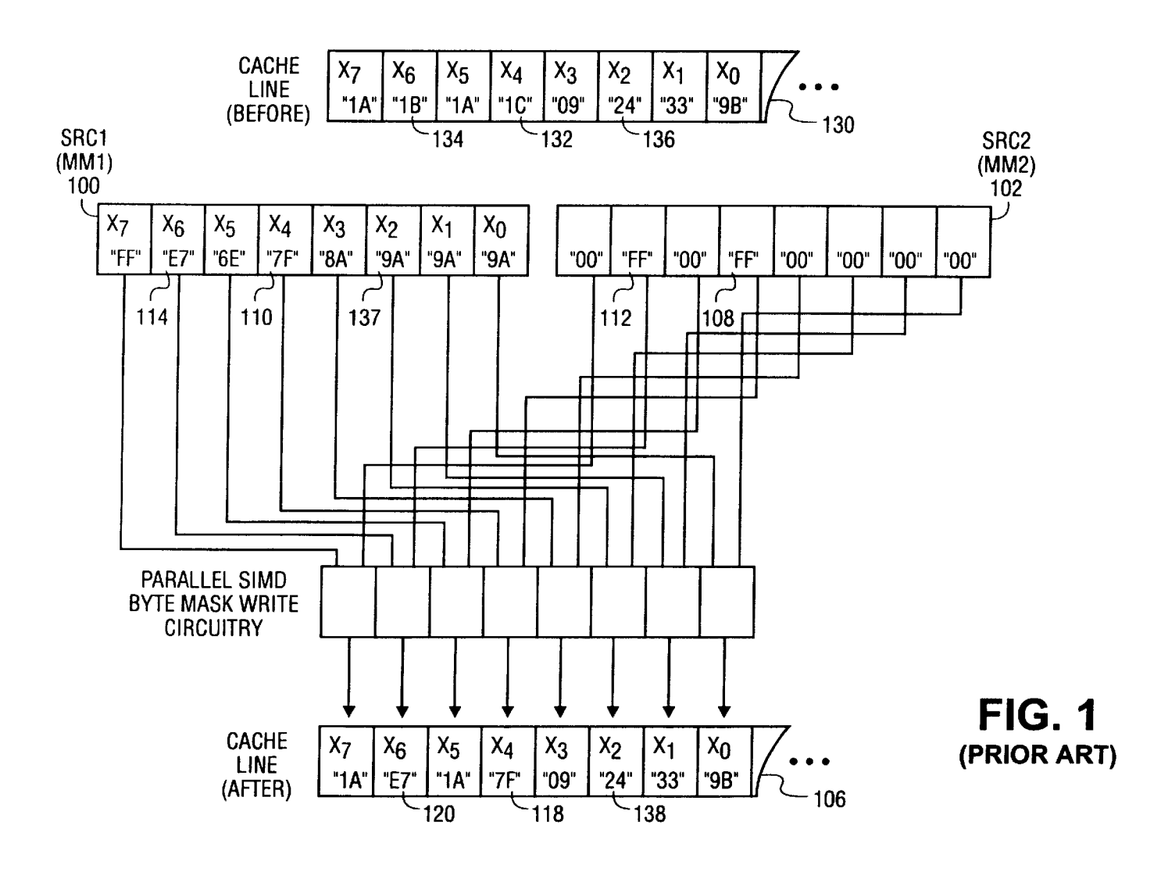
FIG. 1 is a block diagram illustrating specialized parallel circuitry for implementing a SIMD Byte Mask Write instruction in a SIMD architecture.

To avoid this branch misprediction penalty, a Single Instruction, Multiple Data (SIMD) processor architecture is used to support a SIMD "Byte Mask Write" instruction to write packed data from one storage location to another (see U.S. patent application Ser. No. 09/052,802; filed Mar. 31, 1998, now U.S. Pat. No. 6,173,393). FIG. 1 is a block diagram illustrating specialized parallel circuitry for implementing a SIMD Byte Mask Write instruction in a SIMD architecture. FIG. 1 illustrates the SIMD byte masked quad-word move instruction (MASKMOVQ) which moves up to 64-bits representing integer data from a first SIMD register, labeled MM1 and denoted by the first operand SRC1 100, to a memory location 106 implicitly specified by a register, using the byte packed data mask located in a second SIMD register, labeled MM2 and denoted by the second operand SRC2 102. Bytes 110 and 114 of the register MM1 100 are write-enabled by bytes 108 and 112 of the mask stored in the register MM2 102.

As illustrated in FIG. 1 this SIMD Byte Mask Write instruction requires specialized circuitry in the processor to process each byte of a packed data item in parallel. Although the parallel nature of this specialized circuitry achieves relatively good processor throughput, this specialized circuitry requires valuable die area and is only utilized for graphical and similar type processing.

BRIEF SUMMARY OF THE INVENTION

A method and apparatus for selectively writing data elements from packed data based upon a mask using predication are described. In one embodiment of the invention, for each data element of a packed data operand, the following is performed in parallel processing units: determining a predicate value for the data element from one or more bits of a corresponding packed data mask element indicating whether the data element is selected for writing to a corresponding storage location, and storing in the corresponding storage location the data element based on the predicate value.

BRIEF DESCRIPTION OF THE DRAWINGS

The features and advantages of the invention will become apparent from the following detailed description of the invention in which.

DETAILED DESCRIPTION OF THE INVENTION

In the following description, for purposes of explanation, numerous details are set forth in order to provide a thorough understanding of the invention. However, it will be apparent to one skilled in the art that these specific details are not required in order to practice the invention. In other instances, well-known electrical structures and circuits are shown in block diagram form in order not to obscure the invention.

Figure 2:
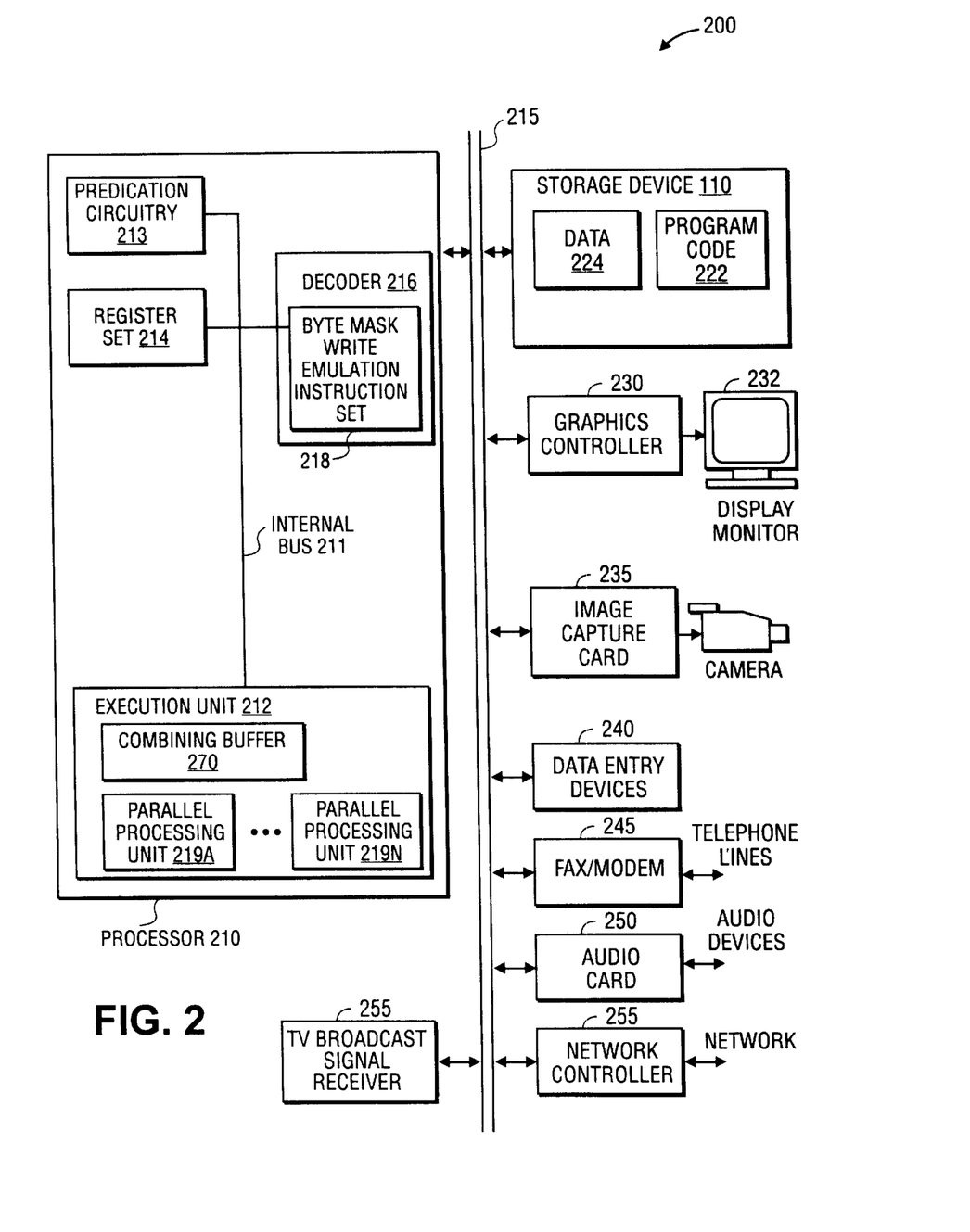
FIG. 2 is a block diagram illustrating a computer system in accordance with one embodiment of the invention.

FIG. 2 is a block diagram illustrating one embodiment of a computer system 200 in accordance with one embodiment of the invention. The computer system 200 comprises a processor 210, a storage device 220, and a bus 215. The processor 210 is coupled to the storage device 220 by the bus 215. In addition, a number of user input/output devices 240 (e.g., keyboard, mouse) are also coupled to the bus 215. The processor 210 represents a central processing unit of any type of architecture, such as CISC, RISC, VLIW, or hybrid architecture. Furthermore, the processor 210 could be implemented on one or more chips. The bus 215 represents one or more buses (e.g., AGP, PCI, ISA, X-Bus, VESA, etc.) and bridges. While this embodiment is described in relation to a single processor computer system, the invention could be implemented in a multi-processor computer system.

In addition to other devices, one or more of a network controller 255, a TV broadcast signal receiver 260, a fax/modem 245, a video capture card 235, and an audio card 250 may optionally be coupled to bus 215. The network controller 255 represents one or more network connections (e.g., an ethernet connection). The storage device 220 and media on which traffic from the network is received by the network controller 255 represents one or more machine-readable media. Thus, a machine-readable medium includes any mechanism for storing or transmitting information in a form readable by a machine (e.g., a computer). For example, machine-readable media include read only memory (ROM); random access memory (RAM); magnetic disk storage media; optical storage media; flash memory devices; electrical, optical, acoustical or other form of propagated signals (e.g., carrier waves, infrared signals, digital signals, etc.); etc.

While the TV broadcast signal receiver 260 represents a device for receiving TV broadcast signals, the fax/modem 245 represents a fax and/or modem for receiving and/or transmitting analog signals representing data. The image capture card 235 represents one or more devices for digitizing images (i.e., a scanner, camera, etc.). The audio card 250 represents one or more devices for inputting and/or outputting sound (e.g., microphones, speakers, magnetic storage devices, optical storage devices, etc.). A graphics controller card 230 is also coupled to the bus 215. The graphics controller 230 represents one or more devices for generating images (e.g., graphics card).

FIG. 2 also illustrates that the storage device 220 has stored therein data 224 and program code 222. Data 224 represents data stored in one or more formats (e.g., a packed data format). Program code 222 represents the necessary code for performing any and/or all of the techniques of the invention. In particular, the program code 222 contains instruction(s) that cause the processor 210 to perform efficient selective writing of data elements from packed data based upon a mask (e.g., emulation of a SIMD byte mask write instruction) using predication and parallel data processing. Of course, the storage device 220 preferably contains additional software (not shown), which is not necessary to understanding the invention.

FIG. 2 additionally illustrates that the processor 210 includes a decoder 216, a set of registers 214, an execution unit 212, an internal bus 211, and predication circuitry 213. Of course, the processor 210 contains additional circuitry, which is not necessary to understanding the invention. The decoder 216, registers 214, execution unit 212, and predication circuitry 213 are coupled together by the internal bus 211. The decoder 216 is used for decoding instructions received by processor 210 into control signals and/or a microcode entry points. In response to these control signals and/or microcode entry points, the execution unit 212 performs the appropriate operations. The decoder 216 may be implemented using any number of different mechanisms (e.g., a look-up table, a hardware implementation, a PLA, etc.).

The decoder 216 is shown including decode circuitry 218 to support instruction(s) to cause the processor 210 to perform selective writing of data elements from packed data based upon a mask. Furthermore, in one embodiment, the processor 210 is a superscalar pipelined processor capable of completing one or more of these instruction(s) per clock cycle (ignoring any data dependencies and pipeline freezes). In addition to these instructions, the processor 210 can be capable of executing new instructions and/or instructions similar to or the same as those found in existing general-purpose processors. For example, in one embodiment the processor 210 supports an instruction set which is compatible with the Intel Architecture instruction set used by existing processors, such as the Pentium® III processor manufactured by Intel Corporation of Santa Clara, Calif.

The execution unit 212 contains multiple parallel processing units 219A–219N, which can process multiple instructions in parallel (e.g., parallel processing units). In one embodiment of the invention, the execution unit 212 also contains a combining buffer 270 for storing data until a 64-bit write could be performed. This combining buffer 270 allows the maximum utilization of the bus 215 by allowing the bus 215 to be used for other purposes while the buffer accumulates data to be stored. However, it will be understood that a combining buffer 270 or a bus 215, either with a width different than 64-bits, is within the scope of the present invention, and that these would engender corresponding differences in certain details of the processing units.

The registers 214 represent a storage area on processor 210 for storing information, including control/status information, integer data, floating point data, packed data (integer and/or floating point), and predicate data. It is understood that aspects of the invention are the described instruction(s) for operating on packed data, as well as how those instruction(s) are used. According to these aspects of the invention, the storage area used for storing the predicate data is not critical. The term data processing system is used herein to refer to any machine for processing data, including the computer systems(s) described with reference to FIG. 2.

In one embodiment of the invention, the predication circuitry 213 is generalized predication circuitry that can be used for any instructions of the instruction set supported by the processor 216. Predication enables conditional execution of all instructions. This technique therefore allows for the removal of branches themselves, and thereby removes the misprediction penalty. See Demystifying the EPIC and IA-64 by Peter Song in Microprocessor Report, Jan. 26, 1998 issue and Arm architecture Offers High Code Density by Brian Case in Microprocessor Report, Dec. 18, 1991 issue. While one embodiment is described where a generalized predication model is used, alternative embodiments could support predication on only certain instructions (e.g., conditional move-type instructions). In addition, while one embodiment is described wherein the masks used for enabling which data elements are written are of the same size as the data elements, in alternative embodiments the masks could be of different sizes (including each mask being composed of a single bit).

Figure 3:
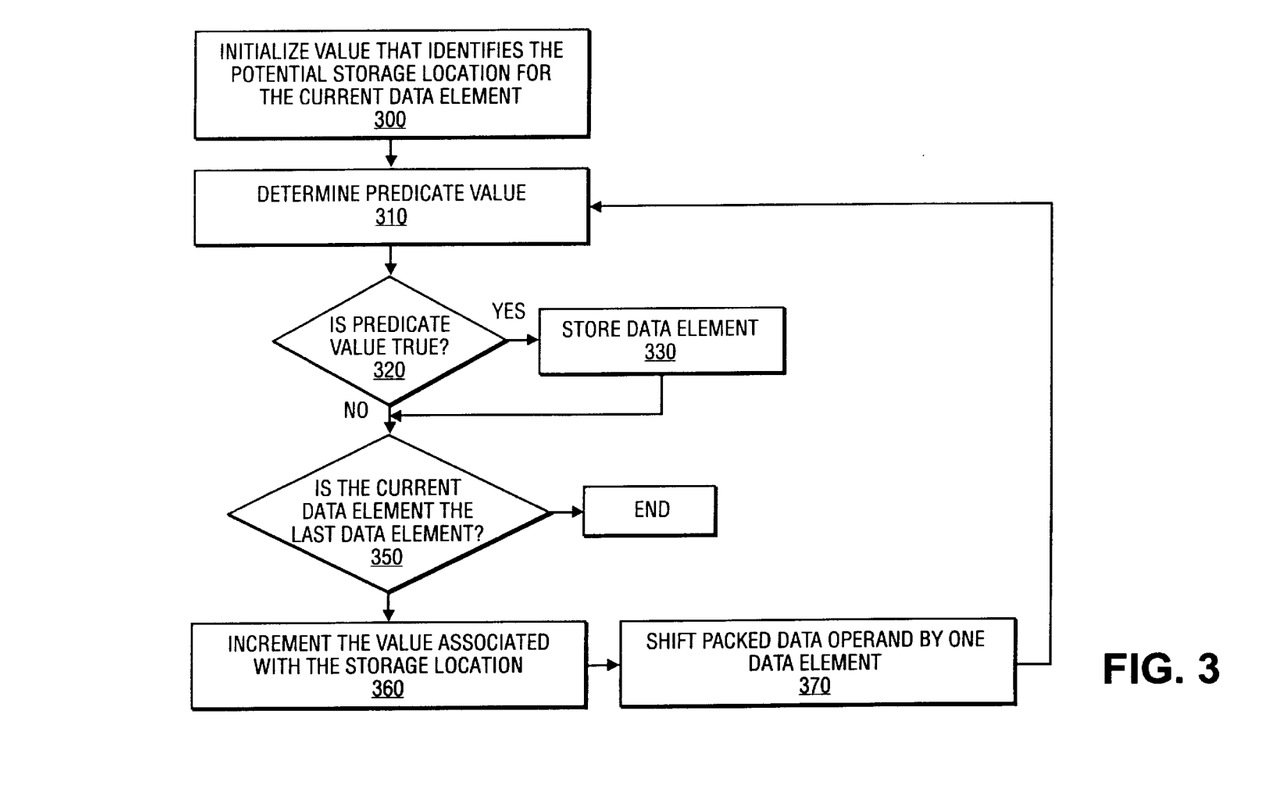
FIG. 3 is a flow diagram according to one embodiment of the invention.

FIG. 3 is a flow diagram according to one embodiment of the invention. At block 305 an initialization value is determined that identifies the potential storage location for the currently selected data element of the packed data operand to be selectively written. From block 305, the process flows to block 310.

At block 310 the value of a predicate for the currently selected data element is determined. In one embodiment of the present invention, the value of the predicate is determined using a test bit ("tbit") instruction. According to this embodiment, the tbit instruction is used to test a bit of the packed mask data element corresponding to the currently selected data element of the packed data operand to be selectively written. This predicate value could be stored in a variety of storage mediums (e.g., a dedicated predicate register, a general-purpose register, etc).

At block 320 of FIG. 3, a decision is made regarding the value of the predicate determined in block 310. According to block 320, if the value of the predicate is true, then the process flow proceeds to block 330. Otherwise, process flow proceeds to block 350.

At block 330, the currently selected data element of the packed data operand is stored (with respect to FIG. 2, the currently selected data element may be store in the combining buffer). After block 330, the process flows to block 350.

At block 350 of FIG. 3, another decision is made regarding whether the currently selected data element is the last data element of the packed data operand to be processed. If the currently selected data element is the last data element to be processed, then the process flow proceeds to exit the method. Otherwise, the process flow proceeds from block 350 to block 360.

At block 360 of FIG. 3, the value associated with the storage location is incremented. For one embodiment of the present invention, this value is located in general-purpose register. However, the value associated with the storage location could be located in a variety of storage mediums. Next, at block 370 of FIG. 3, the packed data operand is shifted by the width of one data element (e.g., assuming the most significant data element of the packed data operand is the currently selected data item, the packed data operand is left shifted such that the next lower data element becomes the most significant data element, and thus the currently selected data element). The process flow then proceeds from 370 back to block 310 and the process is repeated until the last data element is processed.

While one embodiment is described in which shifting is used to select the currently selected data element of the packed data operand, alternative embodiments could used other techniques (e.g., a pointer, support instructions that allows for a designation (see tbit instruction below), etc.) In addition, while FIG. 3 could be interpreted to illustrate sequential processing, it is understood that the operations can be done in different orders (e.g., compile scheduling, loop unrolling, hardware out-of-order execution etc.), various operations can be done in parallel, and/or various other operations may be interspersed in the flow.

One embodiment of the invention may be conceptually viewed as follows:
R2=Address Register
R3=64 bit data Register
R4=Mask Register with corresponding mask elements (x0, x1, . . . , x7)
Code Sequence to selectively write byte size data elements from the packed data operand stored in R3:

| | Instruction Group | | | |
|---|---|---|---|---|
| 1) | p1,p2 = tbit r4, x0 | | | |
| 2) | <p1> store1 r2 = r3 | r2 = r2 + 1 | shiftr r3 = r3 << 8 | p1,p2 = tbit r4,x1 |
| 3) | <p1> store1 r2 = r3 | r2 = r2 + 1 | shiftr r3 = r3 << 8 | p1,p2 = tbit r4,x1 |
| 4) | <p1> store1 r2 = r3 | r2 = r2 + 1 | shiftr r3 = r3 << 8 | p1,p2 = tbit r4,x2 |
| 5) | <p1> store1 r2 = r3 | r2 = r2 + 1 | shiftr r3 = r3 << 8 | p1,p2 = tbit r4,x3 |
| 6) | <p1> store1 r2 = r3 | r2 = r2 + 1 | shiftr r3 = r3 << 8 | p1,p2 = tbit r4,x4 |
| 7) | <p1> store1 r2 = r3 | r2 = r2 + 1 | shiftr r3 = r3 << 8 | p1,p2 = tbit r4,x5 |
| 8) | <p1> store1 r2 = r3 | r2 = r2 + 1 | shiftr r3 = r3 << 8 | p1,p2 = tbit r4,x6 |
| 9) | <p1> store1 r2 = r3 | | | tbit r4,x7 |

Register R2 contains the value associated with the storage location. Register R3 contains the 64-bits of packed data, divided up, in this example, into eight data elements. Register R4 contains the packed mask operand, with eight mask elements, x0–x7, corresponding to the eight data elements of R3.

In the first group of instructions, the code sequence determines the predicate value using the tbit instruction. In this embodiment, the tbit tests the most significant bit of the packed mask element x0. If the bit is 1, then the predicate p1 will be set to true, else the predicate p1 will be set to false. An alternative embodiment could set predicate p1 equal to true is the bit value was 0 and, conversely, set p1 equal to false if the bit value was 1. It should be understood that the tbit instruction could test any bit of the corresponding packed mask element.

In the second group of instructions, the previously stored predication value is used to conditionally store, in this example, one byte to the storage location associated with the value in R4. Also during the second group of instructions, R2 is incremented, R3 is shifted eight bits to the right, and the predicate p1 is reset in the same manner as the first group of instructions except the packed mask element x1 is used instead x0. Multiple parallel processing units allows for the parallel processing of all 4 instructions in the second group of instructions in the same clock cycle(s). The third through the seventh group of instructions continue in the same manner as the second group of instructions, except that each group of instructions uses a different packed mask element. The ninth group of instructions uses predication to conditionally store the last byte to the storage location associated with the value in R4. In this example, the sequence takes 9 clock cycles. However, the amount of clock cycles can vary with the implementation of the processor and/or the number of data elements of the packed data operand.

Accordingly, the invention does not require the use of specialized SIMD Byte Mask Write circuitry. Rather, the use of predication allows for the avoidance of conditional branches, and therefore performance loss due to branch misprediction. The multiple parallel processing units allow for improved processor throughput (e.g., one embodiment of the invention has the required number of parallel processing units to process the instructions of each group above in parallel). This parallelism and predication allows the invention to have comparable performance to a specialized SIMD circuitry implementation of the Byte Mask Write. Moreover, the instructions in Table 1, and thus the circuitry in the processor to support them, are used for many purposes, as compared to the specialized/dedicated byte mask write instruction circuitry which has a much narrower field of use (e.g., graphics processing).

The invention may be implemented at various levels in the processing system. For example, based on the processor architecture, the above code sequence could be manually coded and provided to the processor, generated by a compiler compiling a single instruction, generated by a decoder in the processor responsive to receiving a single instruction, etc.

Figure 4:
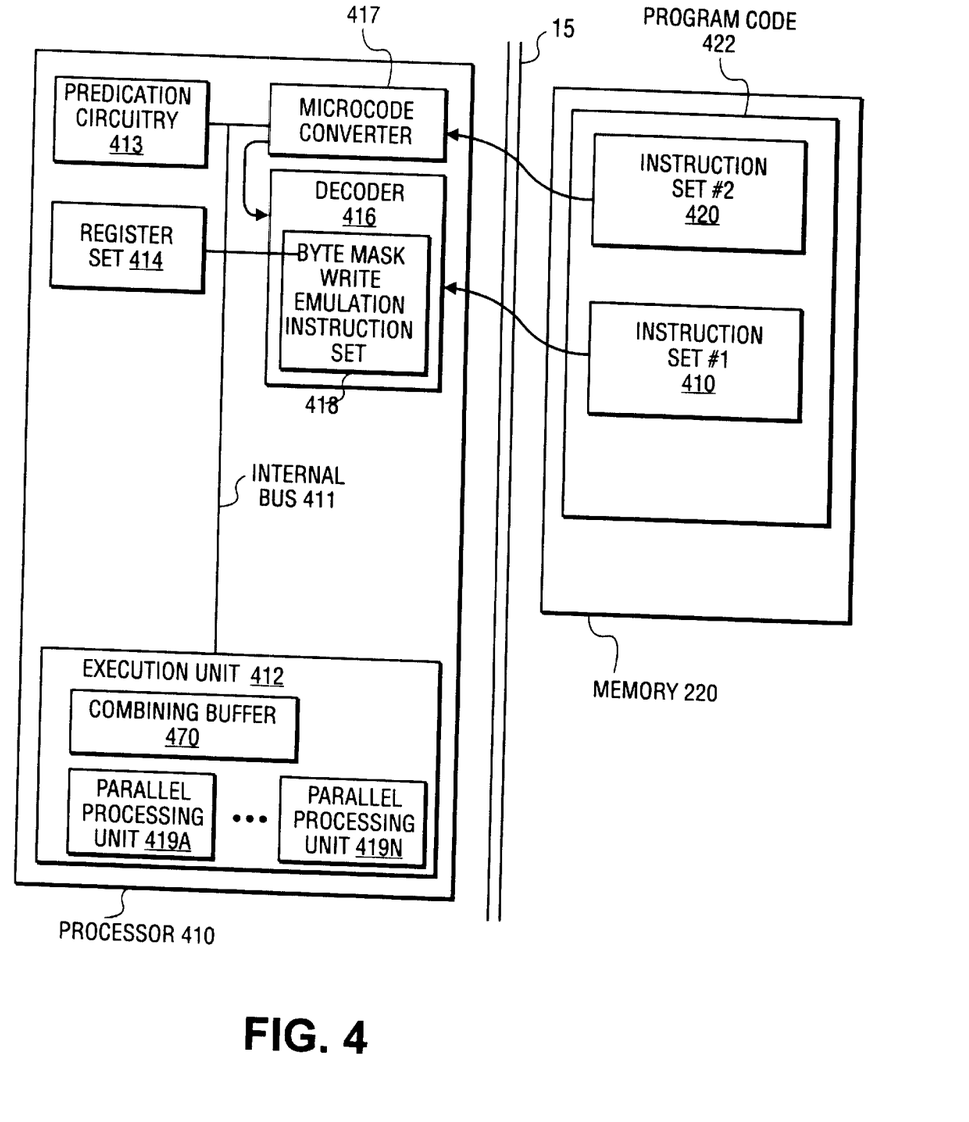
FIG. 4 is a diagram illustrating a selected portion of a computer system in accordance with one embodiment of the invention.

FIG. 4 is a diagram illustrating a selected portion of a computer system in accordance with one embodiment of the invention. The select portion of the computer system comprises the processor 410, the storage device 420, and the bus 415. The processor 410 in FIG. 4 contains additional circuitry, which is not necessary to understanding the invention.

The processor 410 is designed to execute two different instruction sets (e.g., a 64-bit instruction set and a 32-bit instruction set). The term macroinstruction is used herein to refer to an instruction externally received by the processor. In one particular embodiment, the decoder 416 is used for decoding instructions from a first of the instruction sets 410 into control signals and/or microcode entry points. In this case, the instructions from the first instruction set 410, when externally received by the processor 410, are macroinstructions. In addition, the microcode converter 417 is used for converting instructions from the second instruction set 420 (e.g., IA32 Intel Architecture instructions) into the instructions from the first instruction set 410, which are then processed by the decoder 416. In other words, at least certain of the macroinstructions from the second instruction set 420 are converted into a first level microcode made up of instructions from the first instruction set 410. In this case, the instructions from the first instruction set 410, when generated internally to the processor 410, are microinstructions. In one embodiment, the conversion is accomplished using a microcode ROM. For example, in one embodiment, a single SIMD Byte Mask Write macroinstruction may be provided to the microcode converter 417 where it is converted to the appropriate instructions from the first instruction set 410 (here acting as microinstructions) for selectively writing data elements from packed data based upon a mask using predication. In addition, the same instructions from the first instruction set 410 for selectively writing data elements could be received as macroinstructions directly by the decoder 416.

This invention has been described with reference to specific exemplary embodiments thereof. It will, however, be evident to persons having the benefit of this disclosure that various modifications and changes may be made to these embodiments without departing from the broader spirit and scope of the invention. The specification and drawings are, accordingly, to be regarded in an illustrative rather than a restrictive sense.

What is claimed is:

1. A computer-implemented method comprising:
    selecting one data element of a packed data operand as a currently selected data element, wherein each data element of said packed data operand has a corresponding mask data element indicating whether it is selected for writing;
    storing a value indicating a currently selected storage location for said currently selected data element;
    determining a predicate value for the currently selected data element from one or more bits of said corresponding mask element,
    selectively writing the currently selected data element from said packed data operand by performing the following in parallel processing units,
        writing said currently selected data element to said currently selected storage location based on said predicate value,
        incrementing said value indicating said currently selected storage location,
        selecting another data element of said packed data operand as said currently selected data element and determining a predicate value for that data element from one or more bits of said corresponding mask element;
    repeating said selectively writing until the last of the data elements of said packed data operand is the currently selected data element; and
    writing said currently selected data element to said currently selected storage location based on said predicate value.

2. The method of claim 1, wherein said selecting one data element includes selecting the left most significant data element of the packed data operand.

3. The method of claim 1, wherein said selecting another data element includes shifting said packed data operand by one data element.

4. The method of claim 1, wherein said predicate value is stored in a register.

5. The method of claim 1, wherein said predicate value is determined by using a test bit instruction.

6. The method of claim 1, wherein the acts are performed in response to a single macroinstruction instruction which has been decoded into one or more microinstructions.

7. The method of claim 6, wherein said macroinstruction is part of a first instruction set separate and different from a second instruction set including said microinstructions, wherein instructions from said second instruction set can be received directly by said processor.

8. The method of claim 7, wherein instructions from said second instruction set are decoded into control signals and/or microcode entry points.

9. A computer system comprising:
    a processor having predication circuitry and parallel processing units; and
    a storage device coupled to said processor and having stored thereon a set of one or more instructions, which when executed by the processor, causes the processor to selectively write each data element from a packed data operand into a corresponding storage location by:
        for each data element of said packed data operand performing the following in said parallel processing units,
            causing said prediction circuitry to determine a predicate value for said data element from one or more bits of a packed data mask element indicating whether the packed data element is selected for writing to said corresponding storage location; and
            storing in the corresponding storage location the selected data element based on said predicate value.

10. The computer system of claim 9, wherein said set of one or more instructions includes a single macroinstruction instruction that is decoded by the processor into at least one or more microinstructions that causes said processor to selectively write each data element.

11. The computer system of claim 9, wherein said processor includes a combining buffer to receive one or more data elements selected according to said predicates before being written to said corresponding storage locations.

12. The computer system processor of claim 9, said predication circuitry to determine a predicate value for and of the instructions in the instruction set supported by the processor.

13. The computer system of claim 9 wherein said processor includes a first decoder to decode macroinstructions from a first instruction set, and a second decoder to decode macroinstructions from a second instruction set into microinstructions made up of instructions from said first instruction set.

14. The computer system of claim 13, wherein said set of one or more instructions is made up of multiple instructions from said first instruction set.

15. A computer-implemented method for selectively writing each data element from a packed data operand into a corresponding storage location comprising:
    for each data element of said packed data operand performing the following in parallel processing units,
        determining a predicate value for said data element from one or more bits of a corresponding packed data mask element indicating whether said element is selected for writing to said corresponding storage location;

storing in said corresponding storage location the
selected data element based on said predicate value;
and shifting said packed data operand by one data element.

16. The method of claim 15, wherein said predicate value is determined by using a test bit instruction.

17. The method of claim 15, wherein the acts are performed in response to a single macroinstruction which has been decoded into at least one or more microinstructions.

18. The method of claim 17, wherein said macroinstruction is part of a first instruction set separate and different from a second instruction set including said microinstructions, wherein instructions from said second instruction set are able to be received directly by said processor.

19. The method of claim 15 preliminarily comprising:
receiving a single macroinstruction;
decoding said single macroinsruction into a sequence of microinstructions, wherein said microinstructions cause said parallel-processing units to operate on each data element.

20. A computer-implemented method for selectively writing each data element from a packed data operand into a corresponding storage location comprising:

for each data element of said packed data operand performing the following in parallel processing units,
determining a predicate value for said data element from one or more bits of a corresponding packed data mask element indicating whether said element is selected for writing to said corresponding storage location, wherein said predicate value is determined by using a test bit instruction; and
storing in said corresponding storage location the selected data element based on said predicate value.

21. The method of claim 20, wherein the acts are performed in response to a single macroinstruction which has been decoded into at least one or more microinstructions.

22. The method of claim 21, wherein said macroinstruction is part of a first instruction set separate and different from a second instruction set including said microinstructions, wherein instructions from said second instruction set is able to received directly by said processor.

23. The method of claim 20 preliminarily comprising:
receiving a single macroinstruction;
decoding said single macroinsruction into a sequence of microinstructions, wherein said microinstructions cause said parallel-processing units to operate on each data element.

24. A computer-implemented method for selectively writing each data element from a packed data operand into a corresponding storage location comprising:

for each data element of said packed data operand performing the following in parallel processing units, wherein the following are performed in response to a single macroinstruction which has been decoded into at least one or more microinstructions,
determining a predicate value for said data element from one or more bits of a corresponding packed data mask element indicating whether said element is selected for writing to said corresponding storage location; and
storing in said corresponding storage location the selected data element based on said predicate value.

25. The method of claim 24, wherein said macroinstruction is part of a first instruction set separate and different from a second instruction set including said microinstructions, wherein instructions from said second instruction set is able to received directly by said processor.

26. The method of claim 24 preliminarily comprising:
receiving a single macroinstruction;
decoding said single macroinsruction into a sequence of microinstructions, wherein said microinstructions cause said parallel-processing units to operate on each data element.

27. A computer-implemented method for selectively writing each data element from a packed data operand into a corresponding storage location comprising:

receiving a single macroinstruction;
decoding said single macroinsruction into a sequence of microinstructions, wherein said microinstructions cause parallel-processing units to operate on each data element;
for each data element of said packed data operand performing the following in said parallel processing units,
determining a predicate value for said data element from one or more bits of a corresponding packed data mask element indicating whether said element is selected for writing to said corresponding storage location; and
storing in said corresponding storage location the selected data element based on said predicate value.

28. The method of claim 27, wherein the acts are performed in response to a single macroinstruction which has been decoded into at least one or more microinstructions, wherein said macroinstruction is part of a first instruction set separate and different from a second instruction set including said microinstructions, wherein instructions from said second instruction set is able to received directly by said processor.

29. A machine-readable medium having stored thereon one or more instructions, which when executed by a processor, causes said processor to perform the acts of:

for each data element of said packed data operand performing the following in parallel processing units,
determining a predicate value for said data element from one or more bits of a corresponding packed data mask element indicating whether said data element is selected for writing to said corresponding storage location;
storing in said corresponding storage location the selected data element based on said predicate value; and
shifting said packed data operand by one data element.

30. A machine-readable medium of claim 29, wherein said predicate value is determined by using a test bit instruction.

31. A machine-readable medium of claim 29, wherein said acts are performed in response to a single macroinstruction which has been decoded into one or more microinstructions.

32. A machine-readable medium of claim 31, wherein said macroinstruction is part of a first instruction set separate and different from a second instruction set including said microinstructions, wherein instructions from said second instruction set is able to received directly by said processor.

33. A machine-readable medium of claim 32, wherein instructions from said second instruction set are decoded into control signals and/or microcode entry points.

34. A machine-readable medium having stored thereon one or more instructions, which when executed by a processor, causes said processor to perform the acts of:

for each data element of said packed data operand performing the following in parallel processing units,
determining a predicate value for said data element from one or more bits of a corresponding packed data mask element indicating whether said data element is selected for writing to said corresponding storage location, wherein said predicate value is determined by using a test bit instruction; and storing in said corresponding storage location the selected data element based on said predicate value.

35. A machine-readable medium of claim 34, wherein said acts are performed in response to a single macroinstruction which has been decoded into one or more microinstructions.

36. A machine-readable medium of claim 35 herein said macroinstruction is part of a first instruction set separate and different from a second instruction set including said microinstructions, wherein instructions from said second instruction set is able to received directly by said processor.

37. A machine-readable medium of claim 36 therein instructions from said second instruction set are decoded into control signals and/or microcode entry points.

38. A machine-readable medium having stored thereon one or more instructions, which when executed by a processor, causes said processor to perform the following acts, wherein said acts are performed in response to a single macroinstruction which has been decoded into one or more microinstructions:

for each data element of said packed data operand performing the following in parallel processing units, determining a predicate value for said data element from one or more bits of a corresponding packed data mask element indicating whether said data element is selected for writing to said corresponding storage location; and storing in said corresponding storage location the selected data element based on said predicate value.

39. A machine-readable medium of claim 38, wherein said macroinstruction is part of a first instruction set separate and different from a second instruction set including said microinstructions, wherein instructions from said second instruction set is able to received directly by said processor.

40. A machine-readable medium of claim 39, wherein instructions from said second instruction set are decoded into control signals and/or microcode entry points.

41. A computer-implemented method for selectively writing each data element from a packed data operand into a corresponding storage location comprising:

in response to a plurality of instructions, performing the following for each data element of said packed data operand, determining a predicate value for said data element from one or more bits of a corresponding packed data mask element indicating whether said element is selected for writing to said corresponding storage location, wherein said predicate value is determined by using a test instruction; and storing in said corresponding storage location the selected data element based on said predicate value.

42. The method of claim 41, wherein the following is also performed for each data element of said packed data operand:

shifting said packed data operand by one data element.

43. The method of claim 41, wherein the acts are performed in response to a single macroinstruction from which said plurality of instructions have been produced.

44. The method of claim 43, wherein said macroinstruction is part of a first instruction set separate and different from a second instruction set including said plurality of instructions, wherein instructions from said second instruction set can be received directly by said processor.

45. The method of claim 41, wherein said plurality of instructions are microinstructions.

46. The method of claim 41, wherein said plurality of instructions are macroinstructions.

47. The method of claim 41 preliminarily comprising:

translating a single instruction into said plurality of instructions.

48. A processor comprising:

a decoder to decode a set of one or more instructions to selectively write each packed data element of a packed data operand into a corresponding storage location;

predication circuitry coupled with said decoder to determine a predicate value for each of said packet data elements based on one or more bits of a packed data mask element indicating whether that packed data element is selected for writing to said corresponding location;

an execution unit coupled with said decoder comprising, a plurality of parallel processing units to cause said packed data elements to be selectively written into said corresponding locations based on said predicate values;

a combining buffer to store said selected data elements before being written to said corresponding storage locations.

49. The processor of claim 48, wherein the set of one or more instructions comprises more than one macroinstruction.

50. The processor of claim 48, wherein the set of one or more instructions comprises a single macroinstruction.

51. The processor of claim 48, wherein the set of one or more instructions comprises more than one microinstruction.

* * * * *

UNITED STATES PATENT AND TRADEMARK OFFICE
CERTIFICATE OF CORRECTION

PATENT NO. : 6,484,255 B1
DATED : November 19, 2002
INVENTOR(S) : Dulong

It is certified that error appears in the above-identified patent and that said Letters Patent is hereby corrected as shown below:

<u>Column 5,</u>
Lines 42 through 61, delete the "Instruction Group" table, insert --
Instruction Group
1)  p1,p2 = tbit r4,x0
2)  <p1> store1 r2 = r3    r2 = r2 + 1   shiftr r3 = r3<<8   p1,p2 = tbit r4,x1
3)  <p1> store1 r2 = r3    r2 = r2 + 1   shiftr r3 = r3<<8   p1,p2 = tbit r4,x2
4)  <p1> store1 r2 = r3    r2 = r2 + 1   shiftr r3 = r3<<8   p1,p2 = tbit r4,x3
5)  <p1> store1 r2 = r3    r2 = r2 + 1   shiftr r3 = r3<<8   p1,p2 = tbit r4,x4
6)  <p1> store1 r2 = r3    r2 = r2 + 1   shiftr r3 = r3<<8   p1,p2 = tbit r4,x5
7)  <p1> store1 r2 = r3    r2 = r2 + 1   shiftr r3 = r3<<8   p1,p2 = tbit r4,x6
8)  <p1> store1 r2 = r3    r2 = r2 + 1   shiftr r3 = r3<<8   p1,p2 = tbit r4,x7
9)  <p1> store1 r2 = r3 --.

Signed and Sealed this

Second Day of December, 2003

JAMES E. ROGAN
*Director of the United States Patent and Trademark Office*